(12) United States Patent
Rakshe et al.

(10) Patent No.: US 11,713,707 B2
(45) Date of Patent: Aug. 1, 2023

(54) CLUTCH DEVICE FOR A VEHICLE FAN

(71) Applicant: DEERE & COMPANY, Moline, IL (US)

(72) Inventors: Sandeep Rakshe, Pune (IN); Phouphadeth Sananikone, Ludwigshafen (DE); Abhijit Hingne, Khamgaon (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/936,439

(22) Filed: Sep. 29, 2022

(65) Prior Publication Data
US 2023/0139344 A1    May 4, 2023

(30) Foreign Application Priority Data

Oct. 28, 2021   (DE) .......................... 102021128076.1

(51) Int. Cl.
| | | |
|---|---|---|
| F01P 7/00 | (2006.01) | |
| F01P 7/08 | (2006.01) | |
| F16D 41/04 | (2006.01) | |
| F16D 43/25 | (2006.01) | |

(52) U.S. Cl.
CPC .............. F01P 7/087 (2013.01); F16D 41/04 (2013.01); F16D 43/25 (2013.01)

(58) Field of Classification Search
CPC ........... F01P 7/087; F16D 41/04; F16D 43/25

USPC ............................................ 123/41.49, 41.56
See application file for complete search history.

(56) References Cited

U.S. PATENT DOCUMENTS

| | | |
|---|---|---|
| 3,053,363 A | 9/1962 | Weir |
| 4,271,945 A | 6/1981 | Budinski |
| 8,776,915 B2 | 7/2014 | Beylotte et al. |
| 9,121,461 B1 | 9/2015 | Scherman et al. |
| 10,197,134 B2 | 2/2019 | Wys et al. |
| 2008/0093189 A1 | 4/2008 | Wiesneth et al. |
| 2008/0169166 A1 | 7/2008 | Wittkopp et al. |

FOREIGN PATENT DOCUMENTS

| | | |
|---|---|---|
| DE | 102016211145 A1 | 12/2017 |
| EP | 0899858 A1 | 3/1999 |

OTHER PUBLICATIONS

European Search Report issued in application No. EP22199849.5, dated Apr. 3, 2023, 8 pages.

*Primary Examiner* — Hai H Huynh

(57) ABSTRACT

A clutch device for a vehicle fan includes a drive-side clutch element and an output-side clutch element. The clutch device includes a locking mechanism configured between the drive-side clutch element and the output-side clutch element so that a rotary connection established between the drive-side clutch element and the output-side clutch element is released when a drive-side rotational speed reduces in comparison with an output-side rotational speed.

12 Claims, 3 Drawing Sheets

CLUTCH DEVICE FOR A VEHICLE FAN

CROSS-REFERENCE TO RELATED APPLICATIONS

This application claims priority to German Patent Application No. 102021128076.1, filed on Oct. 28, 2021, which is hereby incorporated by reference.

FIELD OF THE DISCLOSURE

The disclosure relates to a clutch device for a vehicle fan.

BACKGROUND

A clutch device for a vehicle fan is, for example, in the form of what is known as a Visco clutch, in the case of which a valve is opened by means of a bimetallic element as a temperature of a vehicle assembly to be cooled increases, in order to convey pressurized hydraulic liquid into a working space of the Visco clutch in order to increase the clutch closure. Consequently, the rotational speed of a fan impeller, driven by the Visco clutch, and therefore its cooling performance increase.

SUMMARY

In the case of some applications, the use of a Visco clutch is however too expensive and therefore uncommon. This applies, for example, to the case of the cooling of internal combustion engines in agricultural tractors of comparatively low power output classes. Here, a rigid coupling is usually brought about between a pulley wheel of a belt drive, driven by the internal combustion engine, and a fan impeller which serves to generate a cooling air stream which loads an engine heat exchanger. When the internal combustion engine is switched off, the belt drive comes to a standstill comparatively rapidly. On account of its mass moment of inertia, however, the fan impeller tends to rotate further for a certain time period. This leads to spinning of the pulley wheel which is connected to it along the stationary drive belt and therefore to undesired wear and perceptible vibrations and/or noise.

It is therefore an object to configure a clutch device of the type mentioned at the outset in such a way that, in the case of a rigid drive connection, it leads to an improved wear and noise behavior of the vehicle fan.

This object can be achieved by a clutch device with the features of one or more of the following embodiments.

A clutch device for a vehicle fan includes, a drive-side clutch element, an output-side clutch element, and a locking mechanism configured or arranged between the two clutch elements so that a rotary connection established between the clutch elements is released if a drive-side rotational speed drops or reduces in comparison with an output-side rotational speed.

The freewheel which is formed in this way can transmit a torque only in one rotational direction. In the case of opposite rotational directions of the two clutch elements with respect to one another, or if the output-side rotational speed is greater than the drive-side rotational speed, the rotary connection is released automatically. In this way, it can be ensured that a fan blade which is driven by means of the clutch device can rotate further in a reaction-free manner even in the case of a retardation or standstill of the drive-side clutch element.

Here, a use of the clutch device is not restricted to a certain vehicle fan. It can thus serve to generate a cooling air stream which loads an engine heat exchanger, but can also relate to any desired other applications in the automotive sector. Here, inter alia, a use in conjunction with an interior compartment ventilation or climate control system of a driver's cab of an agricultural vehicle is conceivable.

Additional features of the clutch device are apparent from the following embodiments.

The drive-side clutch element can have a hub which can be connected to a drive shaft, a plurality of radially pivotable locking claws being attached along an outer circumference of the hub, which locking claws are prestressed into a deflected locking position in each case by means of a spring element in order to establish the rotary connection. The hub has, for example, an internal thread, into which the drive shaft, connected to a pulley wheel, of a belt drive which can be driven by an internal combustion engine can be screwed.

There is the possibility in this case that a plurality of clutch ramps for engaging with a respective one of the locking claws are configured along an inner circumference of the output-side clutch element. In the case of an established rotary connection, the locking claws can bear with a front-side end against a ramp end which runs substantially transversely with respect to the rotational direction. Conversely, the locking claws can be pushed away radially inward out of the deflected locking position along an inner contour of the clutch ramps counter to the prestress which is generated by means of the respective spring element. The locking claws can have a curved course in such a way that they bear in each case in a shoulder region against the inner contour of the clutch ramps. On account of the increase produced in this way of the bearing area, friction-induced wear of locking claws and clutch ramps can be decreased significantly in freewheeling operation. Here, the two parts can be made of surface-tempered steel.

In addition, it is possible that the number of clutch ramps corresponds to that of the locking claws or is a multiple thereof. A total of from four to five locking claws and clutch ramps can be distributed uniformly along the outer circumference of the hub and the inner circumference of the output-side clutch element. The precise number of locking claws is ultimately dependent here on the torques which are to be transmitted by means of the clutch device.

A fastening flange for mounting a fan impeller can be configured on the output-side clutch element. The fan impeller which can be made of fiber-reinforced plastic comprises a plurality of fan blades which serve to generate an axial or radial cooling air stream. Here, the fan impeller can be screwed by means of a fastening hub to a ring with holes which is provided on the fastening flange.

The drive-side clutch element is received rotatably within the output-side clutch element, for example, by means of a deep groove ball bearing. The deep groove ball bearing usually comprises an inner and an outer ball race. The outer ball race can be inserted into a receiving opening, configured on the output-side clutch element, and can be fixed therein in a substantially play-free manner by means of a securing ring which engages into an inner groove which runs around on the receiving opening. In contrast, the inner ball race can be plugged onto a fastening projection, configured on the hub, and can bear there against a peripheral collar. A further securing ring which engages into a peripheral outer groove on the fastening projection can be situated on that side of the deep groove ball bearing which lies opposite the collar, which further securing ring fixes the deep groove ball bearing substantially without play on the fastening projection.

The above and other features will become apparent from the following detailed description and accompanying drawings.

BRIEF DESCRIPTION OF THE DRAWINGS

The clutch for a vehicle fan will be described in greater detail in the following text on the basis of the appended drawings. Here, identical reference signs refer to components which coincide or are comparable with regard to their function. In the drawings.

DETAILED DESCRIPTION

The embodiments or implementations disclosed in the above drawings and the following detailed description are not intended to be exhaustive or to limit the present disclosure to these embodiments or implementations.

Figure 1:
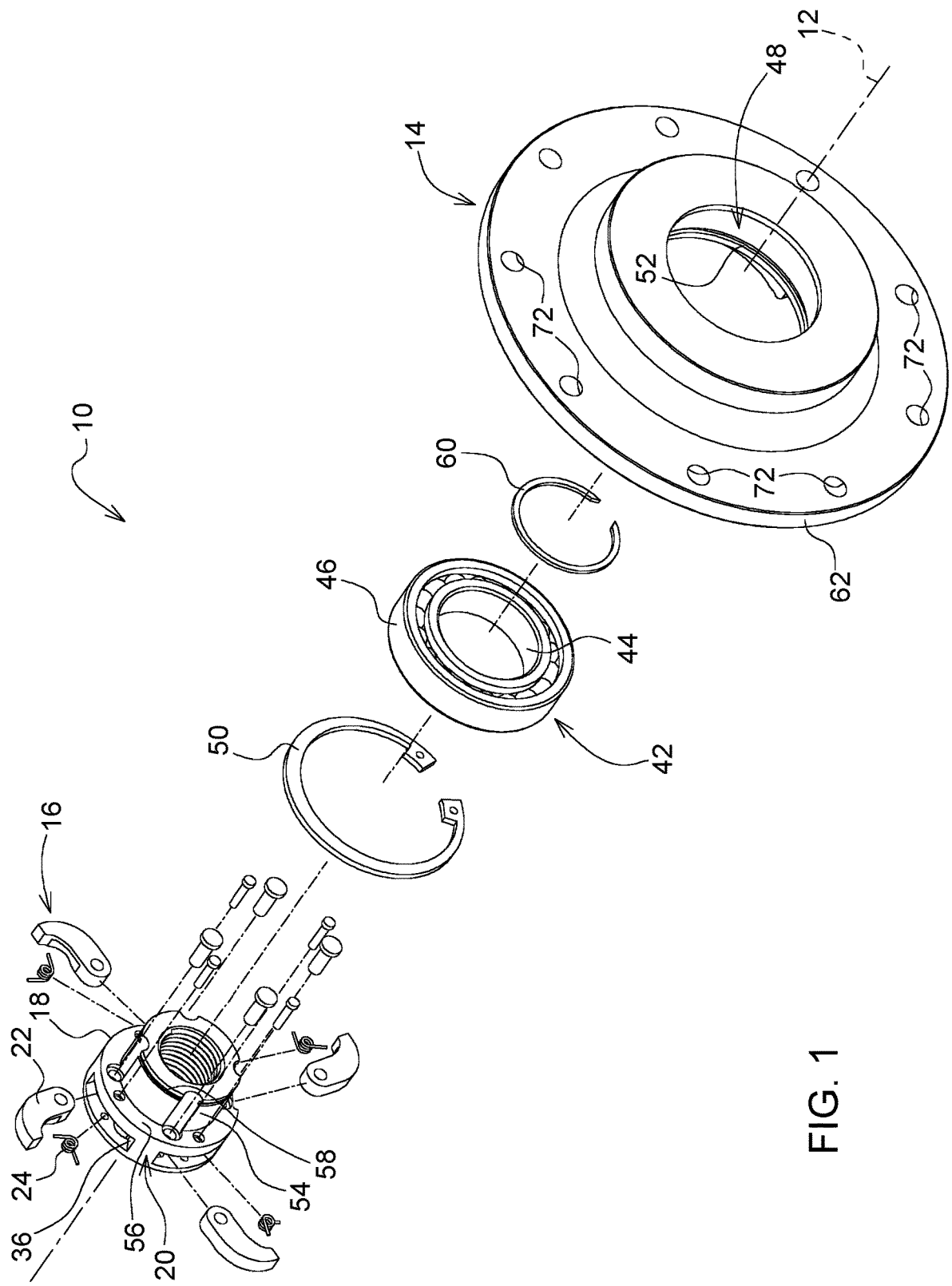
FIG. 1 shows an exploded illustration of the constituent parts of one exemplary embodiment of the clutch device for a vehicle fan.
Figure 4:
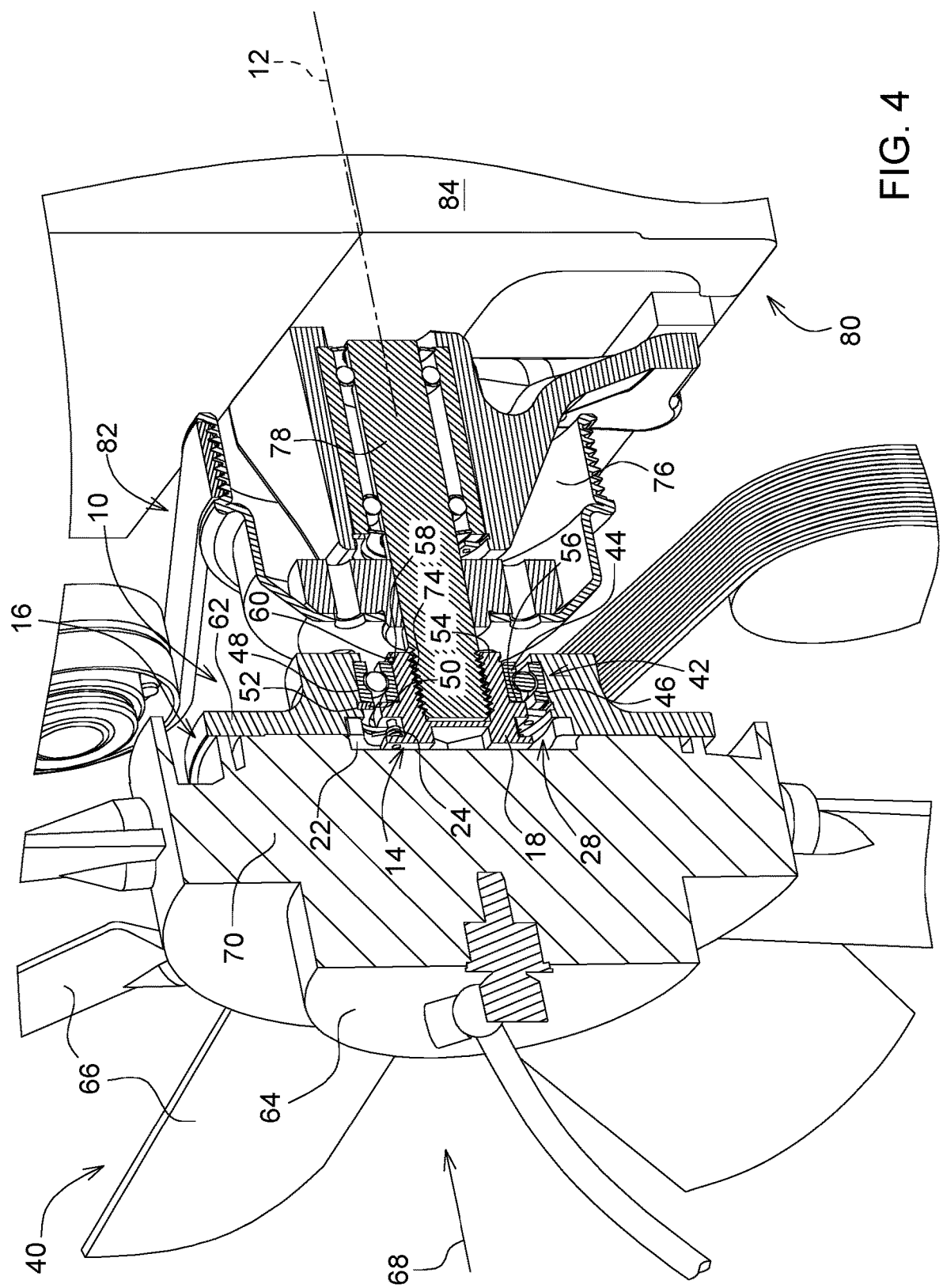
FIG. 4 shows a sectional illustration of the clutch device in a state, in which it is installed on a vehicle fan.

FIG. 1 shows an exploded illustration of the constituent parts of one exemplary embodiment of the clutch device for a vehicle fan which is shown in greater detail in FIG. 4.

Along a common rotational axis 12, the clutch device 10 comprises a drive-side clutch element 14 and an output-side clutch element 16.

Figure 2:
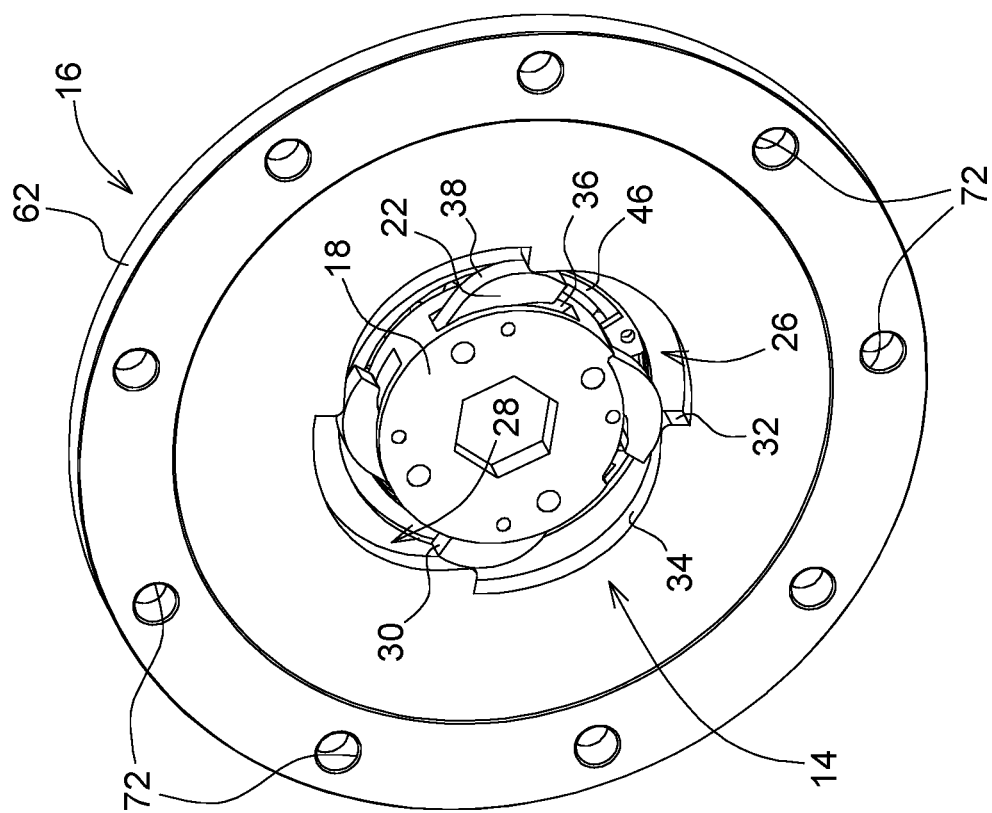
FIG. 2 shows a view of the clutch device according to FIG. 1 in the assembled state in the case of an established rotary connection.

The drive-side clutch element 14 has a hub 18 (in this regard, see also FIG. 4). A plurality of radially pivotable locking claws 22 are attached along an outer circumference 20 of the hub 18, which locking claws 22 are prestressed in each case by means of a spring element 24 into a deflected locking position which is illustrated in FIG. 2, with the result that a rotary connection can be established between the two clutch elements 14, 16.

To this end, a plurality of clutch ramps 28 are configured along an inner circumference 26 of the output-side clutch element 16 for engaging with a respective one of the locking claws 22. As can be seen in FIG. 2, in the case of an established rotary connection, the locking claws 22 bear with a front-side end 30 against a ramp end 32 which runs substantially transversely with respect to the rotational direction.

Figure 3:
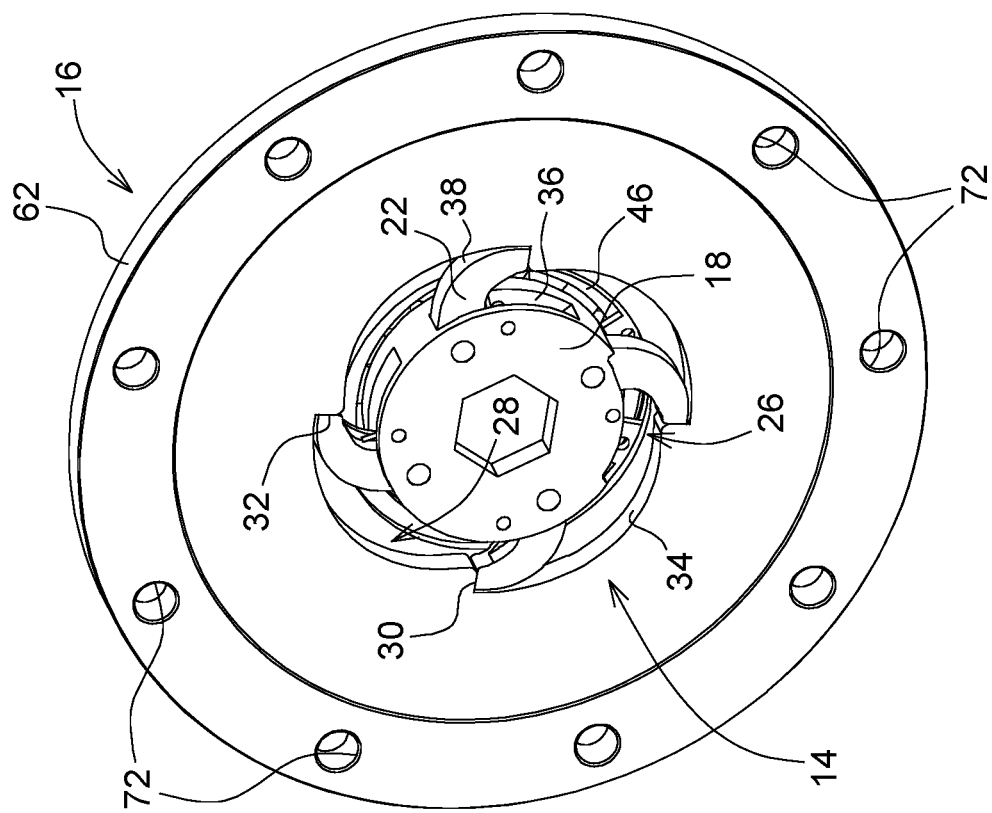
FIG. 3 shows a view of the clutch device illustrated in FIG. 2, in the case of a released rotary connection.

Conversely, in order to release the rotary connection, the locking claws 22 can be pushed away radially inwards out of the deflected locking position along an inner contour 34 of the clutch ramps 28 counter to the prestress which is generated by means of the respective spring element 24, the said locking claws 22 being received at least partially by a respective recess 36 along the outer circumference of the hub 18. This is the case, for example, in the case of opposite rotational directions of the two clutch elements 14, 16 with respect to one another or else when the output-side rotational speed is greater than the drive-side rotational speed. Freewheeling operation of this type is shown in FIG. 3. As a result, the clutch device 10, more precisely the locking mechanism which is formed by way of the locking claws 22 and the clutch ramps 28, transmits a torque only in the predefined rotational direction.

In the present case, the number of clutch ramps 28 corresponds to that of the locking claws 22. As an alternative, however, they can also be a multiple thereof. According to the example, a total of four locking claws 22 and clutch ramps 28 are arranged distributed uniformly along the outer circumference 20 of the hub 18 and the inner circumference 26 of the output-side clutch element 16.

In addition, the locking claws 22 have a tangentially curved course with regard to the outer circumference 20 of the hub 18, in such a way that they bear in each case in a shoulder region 38 against the inner contour 34 of the clutch ramps 28. On account of the increase provided in this way in the bearing area, friction-induced wear of locking claws 22 and clutch ramps 28 can be decreased significantly during freewheeling operation. Here, the two parts can be made of surface-tempered steel.

Furthermore, FIG. 4 shows a sectional illustration of the clutch device 10 in a state, in which it is installed on a vehicle fan 40. As can be seen by way of comparison with FIG. 1, the drive-side clutch element 14 is received rotatably within the output-side clutch element 16 by means of a deep groove ball bearing 42.

The deep groove ball bearing 42 comprises an inner ball race 44 and an outer ball race 46. The outer ball race 46 is inserted into a receiving opening 48 which is configured on the output-side clutch element 16, and is fixed therein substantially without play by means of a securing ring 50 which engages into an inner groove 52 which runs around on the receiving opening 48. In contrast, the inner ball race 44 is plugged onto the fastening projection 54, configured on the hub 18, and bears there against a peripheral collar 56. A further securing ring 60 which engages into a peripheral outer groove 58 on the fastening projection 54 is situated on that side of the deep groove ball bearing 42 which lies opposite the collar 56, which further securing ring 60 fixes the deep groove ball bearing 42 substantially without play on the fastening projection 54.

The fastening flange 62 for mounting a fan impeller 64 which is shown in FIG. 4 is configured on the output-side clutch element 16. The fan impeller 64 which can be made of a fiber-reinforced plastic comprises a plurality of fan blades 66 which serve to generate an axial cooling air stream 68. The fan impeller 64 is screwed by means of a fastening hub 70 to a ring 72 with holes which is provided on the fastening flange 62.

The hub 18 which is enclosed by the drive-side clutch element 14 comprises an internal thread 74, into which a drive shaft 78 which is connected to a pulley wheel 76 is screwed, with the result that the hub 18 and the drive shaft 78 are rotationally connected to one another. The pulley wheel 76 is a constituent part of a belt drive 82 which can be driven by an internal combustion engine 80 and is situated in the engine compartment 84 of an agricultural vehicle (not shown), for example an agricultural tractor.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" at least one of indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A clutch device for a vehicle fan, comprising:
   a drive-side clutch element and an output-side clutch element; and
   a locking mechanism configured between the drive-side clutch element and the output-side clutch element so that a rotary connection established between the drive-side clutch element and the output-side clutch element is released when a drive-side rotational speed reduces in comparison with an output-side rotational speed.

2. The clutch device of claim 1, wherein the drive-side clutch element includes a hub which can be connected to a drive shaft, and a plurality of radially pivotable locking claws being attached along an outer circumference of the hub, wherein the locking claws are prestressed into a deflected locking position in each case by means of a spring element in order to establish the rotary connection.

3. The clutch device of claim 2, wherein a plurality of clutch ramps for engaging with a respective one of the plurality of locking claws being configured along an inner circumference of the output-side clutch element.

4. A clutch device of claim 3, wherein the plurality of clutch ramps corresponds to the plurality of locking claws.

5. A clutch device of claim 1, further comprising a fastening flange for mounting a fan impeller configured on the output-side clutch element.

6. A clutch device of claim 1, wherein the drive-side clutch element is received rotatably within the output-side clutch element by means of a deep groove ball bearing.

7. A vehicle fan for an agricultural vehicle, the vehicle fan including a clutch device, comprising:
   a drive-side clutch element and an output-side clutch element; and
   a locking mechanism configured between the drive-side clutch element and the output-side clutch element such a way that a rotary connection established between the drive-side clutch element and the output-side clutch element is released when a drive-side rotational speed reduces in comparison with an output-side rotational speed.

8. The vehicle fan of claim 7, wherein the drive-side clutch element includes a hub which can be connected to a drive shaft, and a plurality of radially pivotable locking claws being attached along an outer circumference of the hub, wherein the locking claws are prestressed into a deflected locking position in each case by means of a spring element in order to establish the rotary connection.

9. The vehicle fan of claim 8, wherein a plurality of clutch ramps for engaging with a respective one of the plurality of locking claws being configured along an inner circumference of the output-side clutch element.

10. A vehicle fan of claim 9, wherein the plurality of clutch ramps corresponds to the plurality of locking claws.

11. A vehicle fan of claim 7, further comprising a fastening flange for mounting a fan impeller configured on the output-side clutch element.

12. A vehicle fan of claim 7, wherein the drive-side clutch element is received rotatably within the output-side clutch element by means of a deep groove ball bearing.

* * * * *